Feb. 28, 1956 W. M. SPRENG 2,736,605
VANE REGULATOR FOR FIELD CROP SPRAYER
Filed Oct. 2, 1953 6 Sheets-Sheet 1

INVENTOR.
WARREN M. SPRENG
Toulmin & Toulmin
ATTORNEYS

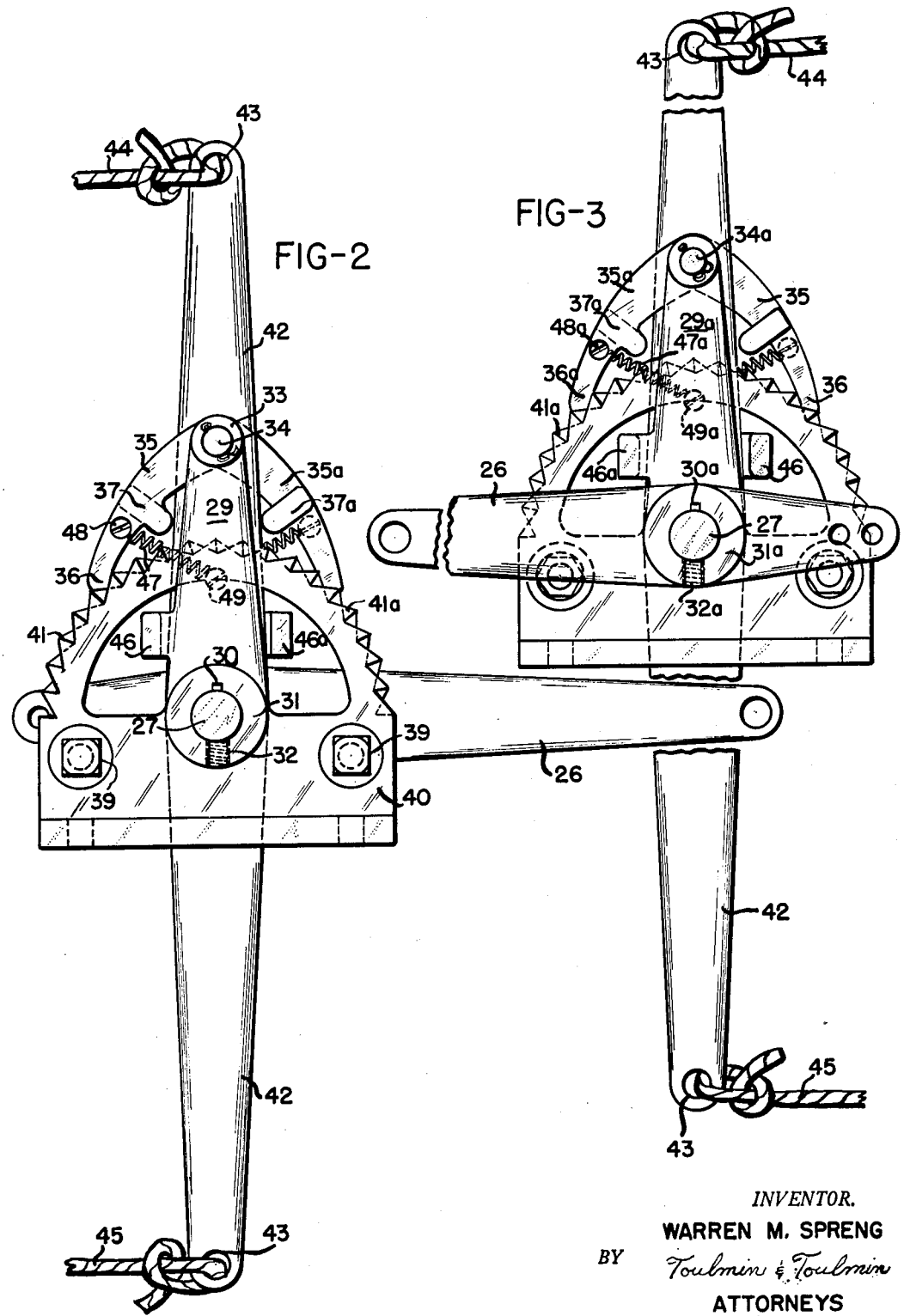

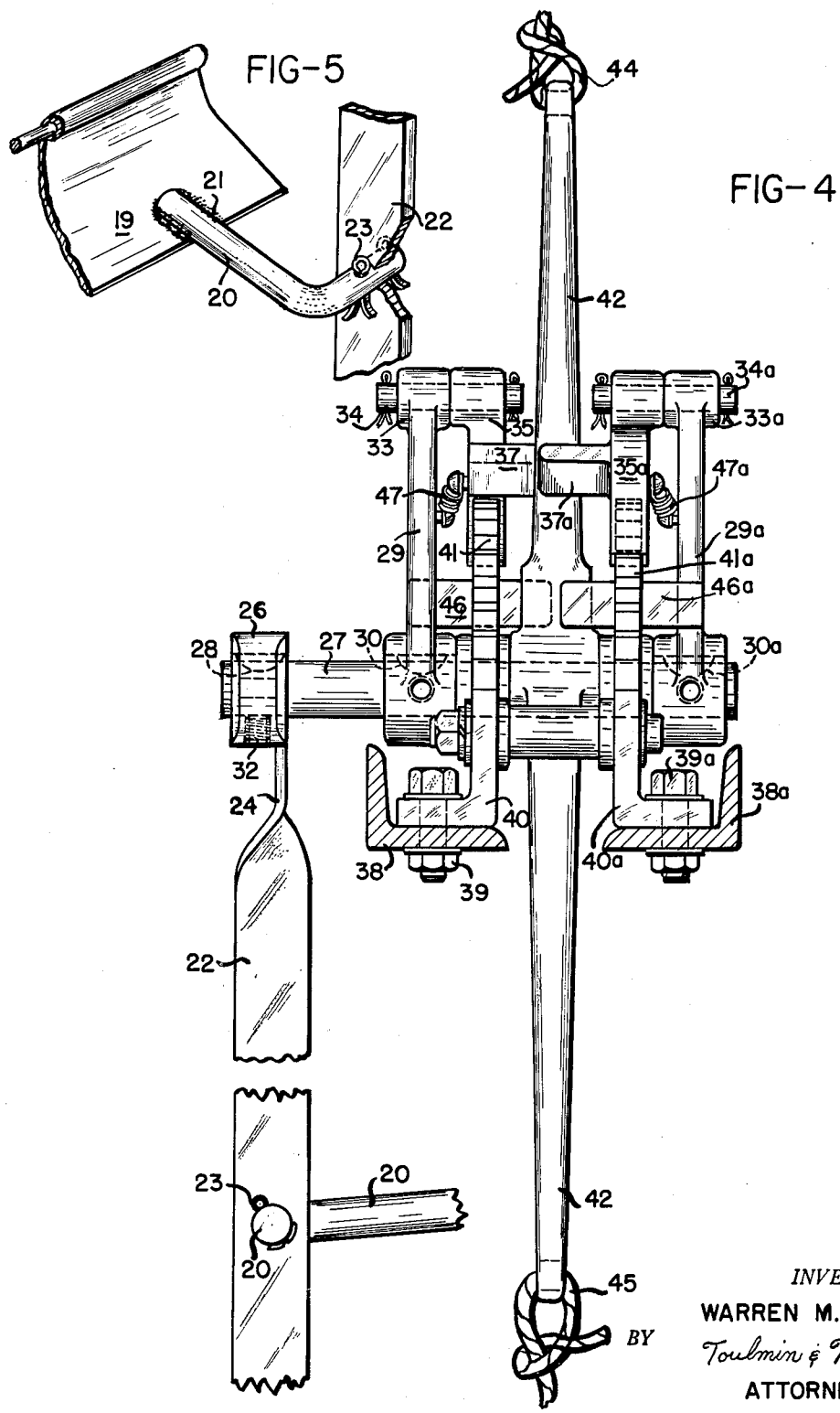

Feb. 28, 1956 W. M. SPRENG 2,736,605
VANE REGULATOR FOR FIELD CROP SPRAYER
Filed Oct. 2, 1953 6 Sheets-Sheet 4

INVENTOR.
WARREN M. SPRENG
BY Toulmin & Toulmin
ATTORNEYS

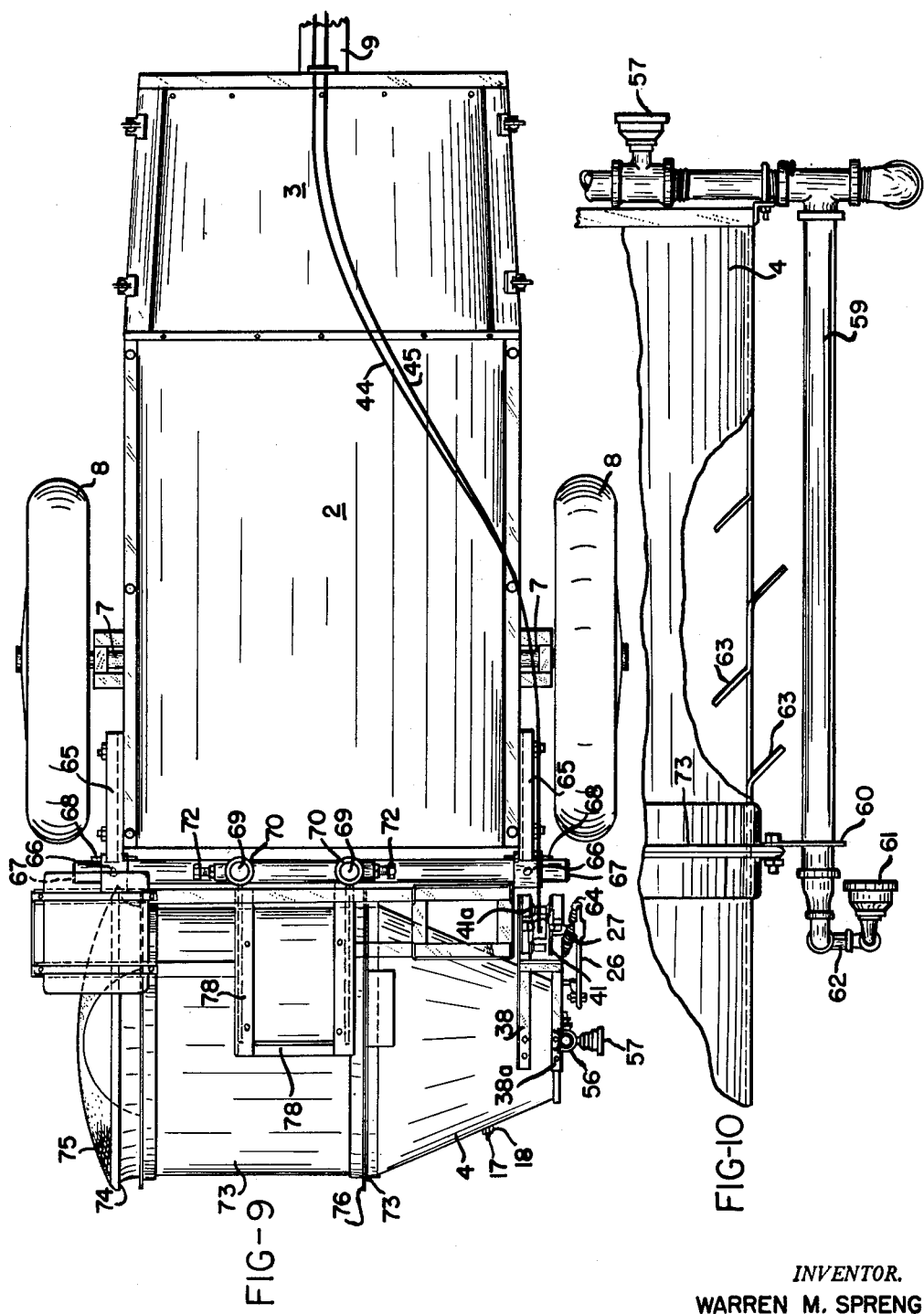

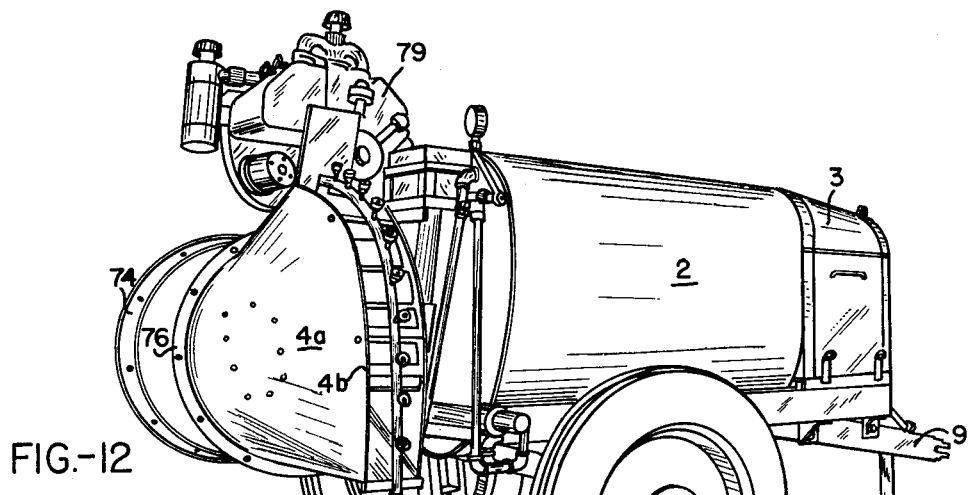
FIG.-12
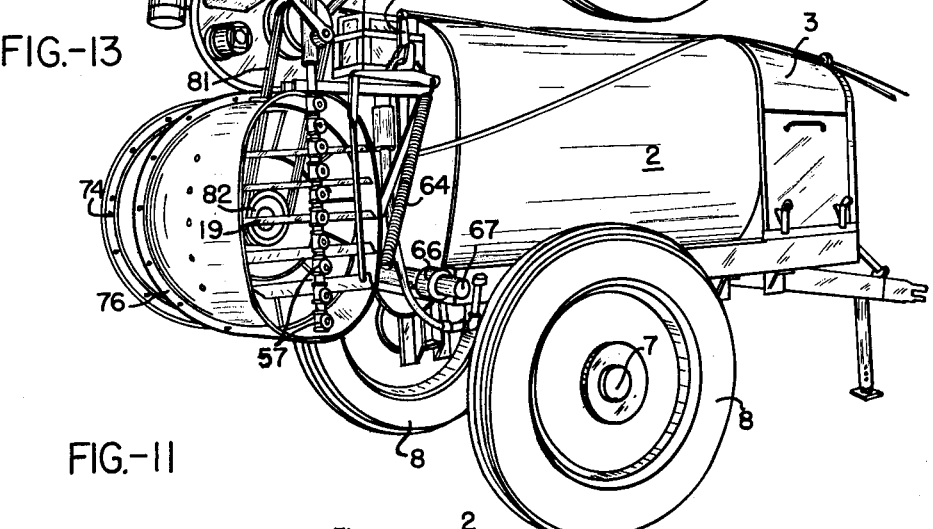
FIG.-13
FIG.-11
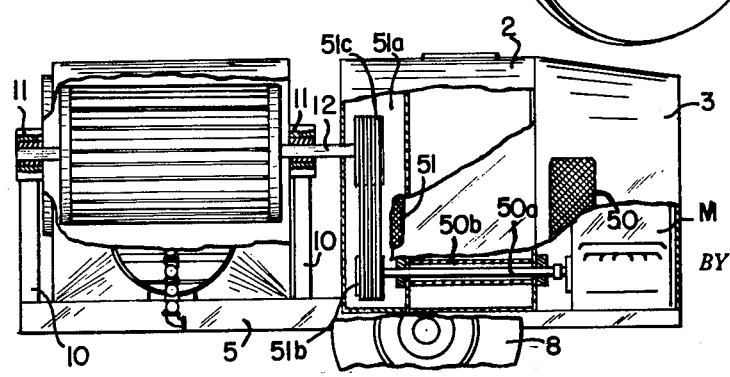
*INVENTOR.*
WARREN M. SPRENG
BY Toulmin & Toulmin
ATTORNEYS

United States Patent Office 2,736,605
Patented Feb. 28, 1956

2,736,605

VANE REGULATOR FOR FIELD CROP SPRAYER

Warren M. Spreng, Ashland, Ohio, assignor to The F. E. Myers & Bro. Company, Ashland, Ohio, a corporation of Ohio Application October 2, 1953, Serial No. 383,734

7 Claims. (Cl. 299—43)

The present invention relates to an improved air blast or blower type sprayer used in spraying insecticides, fungicides, weed-killing chemicals, liquid fertilizers and the like on relatively low-growing crops, so that the air stream which carries the spray material will cover foliage and stems of the crops most effectively.

The modern forms of air blast or blower type sprayers have practically entirely dispensed with the boom form of sprayer on account of the fact that they are much less unwieldly to operate and also that they produce greater concentration of spray-laden air and therefore can cover a much wider area of acreage. However, in sprayers of this type considerable difficulty has been encountered in properly directing the spray-laden air against low-lying crops or bushes and their stems.

In these cases it is necessary that the spray be directed in a precisional manner as not to under-shoot these low-lying crops nor to over-shoot and have the spray for the most part strike the ground with only the fringe of the blast performing the insecticide function. This precision of direction is made particularly difficult where huge quantities of combined spray material and air are being handled and emanate from a fairly small area represented by the exit passageway of the spraying machine. These difficulties are further enhanced when the quantity of the spray-laden air is not uniform over the entire area of the blower exit passageway.

Moreover, the blower type sprays that are on the market do not compensate for irregularities of ground level, which is particularly harmful in case of low-growing crops. Nor do these sprayers provide quick adjustment for various heights of crop growth. The result is that when the spray is projected just above a high contour of ground so as not to be driven into the ground, the spray will continue beyond the hummock in practically a straight line without reaching any low-lying crops or bushes that may be contained within the depression beyond the hummock.

Again, when spraying crops even on level ground, a patch of the crops may be temporarily retarded in growth, while all around this patch the crops may have standard growth. A blower sprayer set at a minimum effective height above the ground would miss the retarded growth crops or bushes, and for the same reason, could not be used alternately for long and short crops, trees, or bushes, without expensive adjustment.

The primary object of the invention is to provide an improved air blast or blower type sprayer which can deliver large quantities of insecticide-laden air per volume and weight unit of sprayer and is capable of directing the spray in a highly precisional manner against crops or bushes that grow near the ground and therefore have short lengths of stem and short heights of foliage or leaves.

Another object is to provide a directed blower sprayer in which the direction of propagated spray remains at a predetermined set angle even when the sprayer moves over rough terrain and unless this angle is changed at will by the operator.

Another object is to provide a blower sprayer of the air-borne type in which the range of height over which the spray is effective is increased and can be quickly shifted up or down to accommodate any height of crop or contour of ground.

Still another object is to provide an improved blower sprayer of the air-borne type in which the sub-divisions of the spray stream leave the blower device in parallel overlapping planes which can be altered as a group in an instant of time to cause the spray to reach any selected part of the crop or bush.

A still further object is to provide a blower sprayer having an exit opening and contained blower or fan which produces a uniform concentration of spray per unit area over the entire exit opening.

An additional object is to provide a blower sprayer having an air exit opening containing a number of air directing vanes arranged parallel to one another, together with mechanism by which the vanes can be moved in unison from the driver seat.

A still further object is to provide a blower type sprayer in which the direction of propagation of the spray is precisionally controlled in degrees of adjustment which will remain fixed at each setting until changed by the operator and will not change as the result of vibration when traveling over a rough road or as a result of high velocity air impinging against the directional vanes.

A still further object is to eliminate the unwieldly spray booms now commonly used for spraying field crops and to substitute therefor a blower sprayer of improved type which will provide more effective coverage through swirling of the foliage by the air blast than in the case of the use of a boom.

Another object is to provide a highly efficient blower in combination with a sprayer of improved character which operate together in creating insecticide laden air blasts, and particularly in handling large quantities of the treated air propagated at a uniform intensity over the entire exit area of the sprayer.

The above objects are attained, in brief, by providing the air blast sprayer with a series of swivel vanes or louvres in the exit opening of the blower which not only can be quickly shifted to give any directional effects to the issuing air, but also through an escapement mechanism these vanes or louvres remain in that rigid position until changed at will by the operator. The blower is of a highly efficient type in that all surfaces over which the streams of air pass have been predetermined to eliminate any vacuum effects, eddy currents, or other forms of disturbance or turbulence which would reduce the velocity of the air going out, or at least disturb the uniform distribution of that air.

Other objects and features will be apparent as the specification is perused in connection with the accompanying drawings, in which:

Figures 2 and 3 represent the front and rear views of the improved escapement mechanism which controls the movement of the guide vanes that give precisional directional effect to the insecticidal-laden air;

Figure 4 is an elevational view of the mechanism shown in Figures 2 and 3 with some parts in section and including the upper portion of the control arm attached to the guide vanes;

Figure 5 represents, in perspective, a fragmentary view of a connecting rod detail showing the manner in which it is attached to one of the guide vanes;

Figure 9 represents a plan view of the blower sprayer shown in Figures 6 and 7, but with the engine removed;

Figure 10 is a fragmentary view of the lower portion of the fan chamber in both types of sprayer shown in Figures 1 and 6; the lower part of the chamber has been broken away to show the stationary deflectors which cooperate with a spray stream under the chamber;

Figure 11 is a side elevational view, partly broken away, of the Figure 1 arrangement showing the drive to the blower;

Figure 12 is a perspective view of an orchard sprayer adapted for having a control vane arrangement according to this invention associated therewith; and Figure 13 is a perspective view of the Figures 6 through 10 construction.

Figure 1:
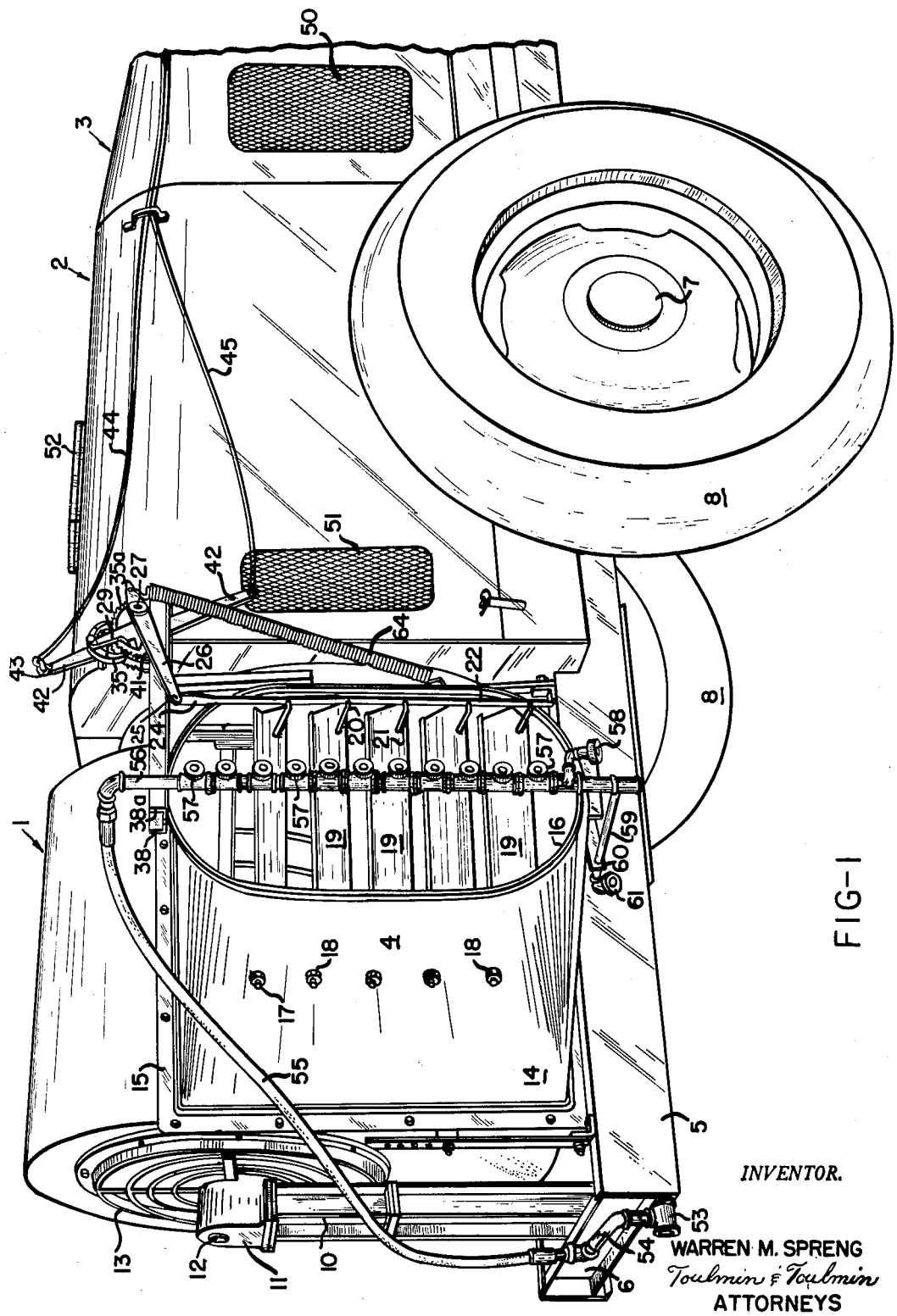
Figure 1 represents a perspective view of one type of the improved blower sprayer; this view is taken mainly looking at the side of the machine from which the spray-laden air is propagated.
Figure 7:
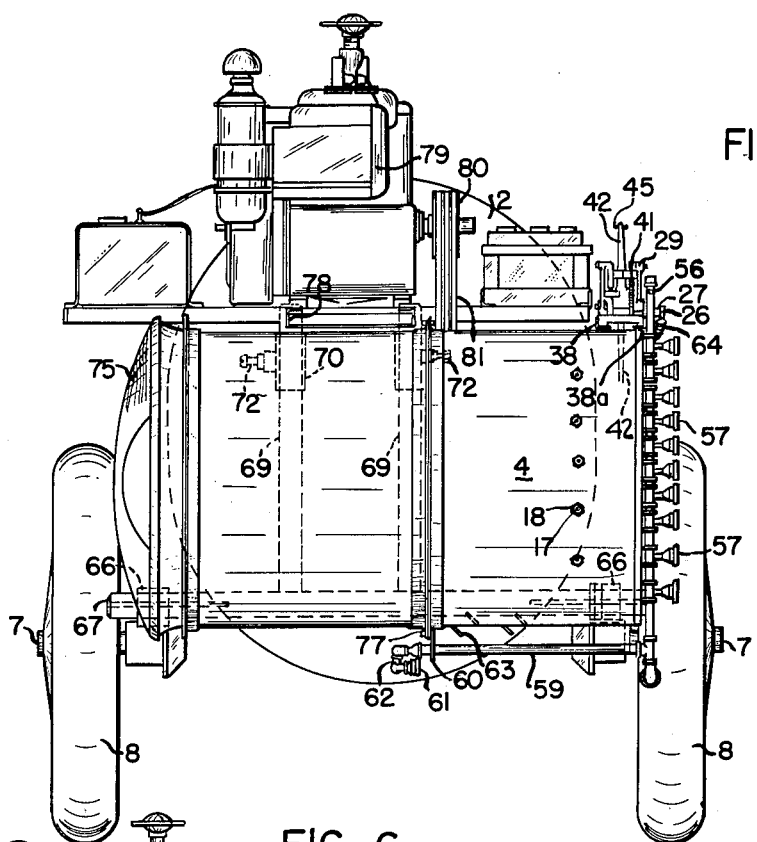
Figure 7 depicts a rear end view of the sprayer shown in Figure 6.
Figure 6:
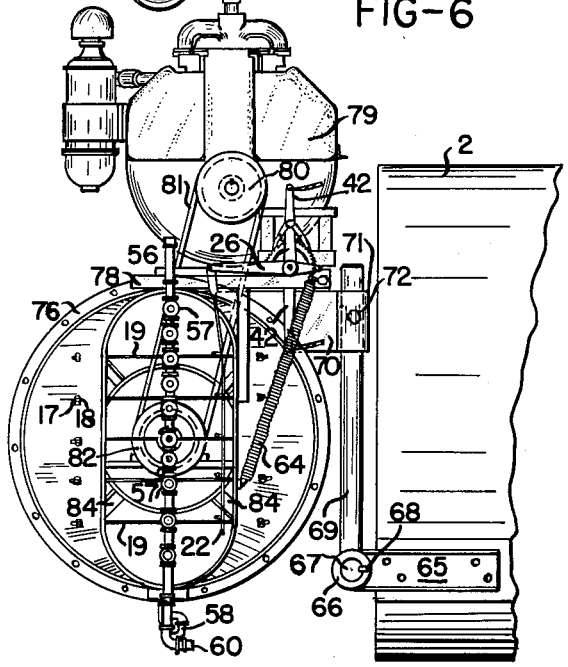
Figure 6 is a fragmentary side elevational view of another type of the improved blower sprayer but showing, in general, the same form of the spray-guiding mechanism as was shown in connection with Figure 1.
Figure 8:
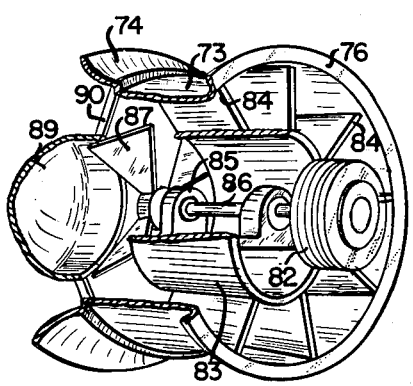
Figure 8 is a perspective view, partly broken away and in section, of the blower fan used in the sprayer shown in Figures 6 and 7.

Referring to the drawings, particularly Figure 1, the improved blower type sprayer comprises four principal parts, the blower casing generally indicated at 1, the tank 2 containing insecticide, fungicide, weed killing chemicals or liquid fertilizers, the engine compartment 3, and the spray directive control element including the control chamber 4. These elements or members are supported preferably on a heavy rectangular iron frame having longitudinal side and end members 5, 6 mounted on an axle 7 provided with tired wheels 8.

A hitch bar 9 (Fig. 9) may be provided at the front end for attachment to a tractor or to a horse-drawn vehicle. The apparatus as indicated by the elements 1, 2, 3 and 4 is complete within itself to provide the necessary power spray so that the apparatus can be connected and disconnected from the traction power.

*Description of blower, control chamber and spray-guiding mechanism*

There are two uprights 10, of which one is shown in Fig. 1, extending upwardly from the frame 5, 6 for supporting a pair of spaced bearings 11 which serve as journals for the blower shaft 12.

The second upright 10 is mounted by welding or being bolted to a transverse iron member (not shown) which extends across the side members 5 at a position between the blower casing 1 and the tank 2. On the shaft 12 there is mounted a conventional squirrel cage blower, i. e. one that takes the inlet air from openings axial of the shaft and delivers the air circumferentially from the rotary fan. The air entrance to the fan is indicated by the flanged circular member 13 secured to the rear end of the blower casing and having a series of annular openings.

The casing 1 has a relatively large rectangular opening at the side facing the observer, as seen in Fig. 1, and a flange extends around the perimeter of this opening. There is a tapered housing 14, rectangular at one end, and having an outwardly extending flange indicated at 15 which can be screwed or otherwise secured to the coflange of the blower casing. The housing 14 tapers at both sides to an oval or elliptical shaped opening 16 having a reinforced edge.

A series of parallel rods 17, five as illustrated, span the housing at a position just inside the reinforced edge 16. These rods are held by nuts 18 and pass through circularly bent edges of a number of vanes or louvres 19. These vanes are constituted of metal, sufficiently thick to prevent bending or distortion when subjected to high velocity air. They are flat in configuration except for the curved edges through which the rods 17 loosely extend. Thus the vanes 19 can swivel on the rods. However, they are arranged in parallel planes and operate in unison by means of an angular connecting link 20 welded at 21 (Fig. 5) to one end of each of the vanes.

The links 20, of which there are the same number as the number of vanes, pass through openings in a vertical flat bar 22 to which they are detachably secured by cotter pins 23. The purpose of the bar 22 is to maintain the vanes 19 in parallel relationship and by moving the bar 22 upwardly in a manner to be described hereinafter, the vanes are caused to swivel upward about their respective rods 17.

The upper end of the bar 22 is twisted as indicated at 24 (Fig. 4) and is bolted at 25 (Fig. 1) to a lever 26 which is mounted on a shaft 27. This shaft is suitably journaled for rotation in bearings in ratchet frames 40 and 40a and the lever 26 is keyed to the shaft as indicated at 28 (Fig. 4). There is a second lever 29, also keyed to the shaft at 30 (Fig. 2), this lever being provided with a hub 31 to accommodate a set screw 32.

Thus, as the lever 29 is moved right or left, the shaft 27 is correspondingly turned and the lever 26 caused to move either downwardly or upwardly and thus vary the vertical position of the bar 22. This, in turn, causes the vanes 19 to swing about their respective rods.

The upper end of the lever 29 has a hub 33 for carrying a shaft 34 which is free to rotate within the lever. The shaft passes loosely through a link member 35 which has an arcuate shape and serves as a pawl with an active point 36. The pawl or link member 35 is provided with an inwardly extending projection 37 (Fig. 4), the purpose of which will be described hereinafter.

There is an angle iron member 38 (Fig. 4) secured to and extending outwardly from the top of the control chamber 4 and to this member there is bolted, as indicated at 39, a ratchet frame 40, the upper portion of which has a circular configuration and is provided with teeth 41 for receiving the end 36 of the pawl or link member 35. This ratchet frame has an opening for loosely receiving the shaft 27. Thus the ratchet is held fixed in position.

The shaft 27 also loosely receives a long lever 42, the arms of which at each end are provided with openings 43 to which cords 44, 45 are knotted. The purpose of the lever 42 is to cause the rotation of the lever 29 and thus cause the lever 26 to move either upwardly or downwardly for regulating the position of the vanes 19. For this purpose the lever 29 is provided with a horizontally extending lug 46, shown more clearly in Fig. 4, which is of a length to extend into the path of travel of the lever 42.

Thus, as the lever 42 is caused to rotate in the counter-clockwise direction, as seen in Fig. 2, about the shaft 27 by pulling on rope 44, the left-hand edge of the upper arm of the lever first contacts the projection 37 which causes the link or pawl member 35 to rotate upwardly about the shaft 34 and to withdraw the pawl 36 from the engaging tooth 41 of the ratchet 40. This action unlocks the lever 29 and permits the lever to swing, carrying with it the shaft 27.

This is accomplished by the further movement of the upper arm of the lever 42 which contacts the inside surface of the lug 46 and, since the latter is attached to the lever 29, is caused to move in a counter-clockwise direction to rotate the shaft 27 and thus to raise the bar 22 connected to the guide vanes. This swinging action of the lever 42 is caused by a pull on the rope 44 and when this pull is released the lower point 36 of the pawl is caused to engage a new tooth on the ratchet by means of a tension spring 47 which is attached at 48 to the pawl and at 49 to the lever 29.

Inasmuch as the ends 36 and 36a of the pawls are engaged in the ratchet teeth 41 and 41a upon assuming the new position and held in that position by the springs 47 and 47a, the levers 29, 29a and 26 will be held rigidly in the position which they have assumed as a result of the counter-clockwise movement of the upper end of the lever 42 (Fig. 2). The lever 42 will remain in whatever counter-clockwise swung-over position the operator desires, until the operator pulls on rope 45. Consequently, the vanes 19 are rigidly held in the new position even when the sprayer is being transported over rough terrain and is subjected to seveer jostling and vibration.

In order to move the vanes in the opposite direction in response to a clockwise movement of the lower portion of the lever 42 as a result of pulling on the rope 45, a set of elements duplicate of those shown and described in connection with Fig. 2 are provided, but which operate in the opposite direction. As shown more particularly in Fig. 4, a lever 29a is keyed at one end to the shaft 27, the key being indicated at 30a. The outer end of the lever is rotatably mounted on a shaft 34a which loosely carries a pawl or link member 35a, the latter being adapted to swing about the shaft 34a. The lever 35a is provided with an inwardly extending projection 37a positioned in line with the lever 42 as can be seen in Fig. 4.

There is a ratchet member 40a having teeth 41a which are engageable by the end 36a of the pawl. The ratchet member is secured by bolts 39a to an angle iron member 38a which is welded or otherwise supported from the upper surface of the housing 4. A spring 47a is attached by screws 48a and 49a to the pawl and the lever 29a respectively.

There is a lug 46a secured to the lever 29a and extending inwardly in juxtaposed position to the companion lug 46. These lugs are so positioned that when the lever 42 moves in the counter-clockwise direction (Fig. 2) the edge of the lever will strike the lug 46. But when this lever 42 is moved in the clockwise direction (Fig. 2) the lever will strike the companion lug 46a.

The operation in reversing the movement of the vanes from that described in Fig. 2 is the same as that already described except that the second group of elements that bear the subscript "a" cooperate and move in the reverse direction from the members which do not bear the subscript.

Thus, in Fig. 3, assuming that the lower end of the lever or actuating arm 42 is moved in the counter-clockwise direction by a pull on the cord 45, the upper end of the lever 42 first strikes the projection or abutment 37a to move the end of the pawl 36a out of engagement with the ratchet teeth. Further movement of the lever 42, as the cord 45 is pulled, will cause the upper end of the lever 42 to strike the lug 46a and cause the lever 29a to swing with its shaft 27 in the counter-clockwise direction. The lever 26 which is fixedly assembled with the lever 29a through shaft 27 is therefore caused to move downwardly. This action, in turn, pushes the bar 22 downward and causes the vanes 19 to swing downward about their rod axes 17.

It should be noted that when the lever 26 is being moved upwardly, as when the upper end of the lever 42 is pulled in the counter-clockwise direction (Fig. 2), the pawl 35a presents no retarding or locking effect since it merely slips over the teeth 41a. The same thing applies with respect to the pawl 35 when the lever 42 is moved in the clockwise direction (Fig. 2) in that the pawl 35 is merely caused to slip over the ratchet teeth 41.

The locking action of the pawls 35, 35a, depending upon the direction in which the upper end of the lever 42 is moved, rigidly holds the vanes 19 in whatever position they have assumed when the ropes 44, 45 are operated. It is apparent that any degree of movement can be given to the guide vanes 19, up or down, depending upon the direction in which the lever 42 is swung and the amount of the swing. This vane movement can range between a totally closed air exit opening to a fully opened opening and the vanes can be caused to slant upwardly or downwardly between these limits.

The cords 44, 45 are sufficiently long as to be grasped by the operator of the tractor, and by pulling on one rope and releasing the other, the angle of direction of the propagated air and the amount of air can be controlled with great precision from the operator's position.

The blower indicated in Fig. 1 is of the so-called squirrel cage type in which the air is introduced at the annular openings 13 and the out-going air is directed from the periphery of the impeller through the tapered housing 4 to the oval opening bordered by the reinforcement 16. This air passes by the vanes 19 which serve to control the direction of the air as it leaves the oval opening and also, to some extent, the amount of air that is permitted to go through the opening, as has been explained hereinbefore.

The power for the blower is obtained from an industrial engine M situated under the hood 3 which has expanded metal ventilators 50. The shaft 50a is coupled to the engine, this shaft passing through a water-sealed protection tube 50b at the bottom of the tank 2 into a compartment 51a at the end of the tank opposite the engine, having a second set of ventilators 51. Within this compartment there is a pulley 51b attached to the shaft 50a and a multiple V-belt drive to a pulley 51c on the blower shaft. The impeller of the blower can be run at any desired constant speed by such a belt drive mechanism and, if desired, this mechanism can be of an adjustable character to give a variable speed to the impeller.

Liquid spray apparatus

The insecticide or fungicide and the water vehicle are introduced at the cover 52 on the tank 2 and there is a pipe from the lower end of the tank and attached to the frame 5, this pipe terminating at the end of the frame in a T 53.

The spray fluid from the tank 2 is placed under pressure by a suitably positioned pump located in the engine compartment 3 and driven from shaft 50a with a multiple V-belt drive. From the coupling 53 the fluid is taken through a series of pipes 54 and through a flexible tube 55 to the upper end of a vertical pipe 56 secured in any suitable manner to the tapered housing 4 at a position which corresponds with the edge of the oval opening. From this pipe 56 a number of nozzles 57 are taken, the openings in the nozzles being directed outwardly away from the vanes 19. If desired, an additional nozzle 58 may be provided at the lower end of the pipe 56 and directed downwardly against the ground.

A small extension 59 may be taken from the lower end of the pipe 56 and held in suitable brackets 60, this pipe terminating in a nozzle 61 attached to a U-shaped fixture 62. The nozzle 61 extends as far back as the nearer frame member 5 (Fig. 1) and is directed toward the observer.

The lower side of the tapered housing 4 is provided with a series of bent-down and bent-up flaps 63 to leave air openings along the lower surface of the housing (see Fig. 10). The purpose of the nozzles 58, 61 and the openings formed by the flaps 63 will be explained presently.

The liquid spray, which is under pressure from the pump located in engine compartment 3, is conducted from the tank 2 to the vertical pipe 56 and the spray streams are emitted from all of the nozzles 57, 58 and 61. As the treated spray leaves the nozzles, particularly those designated 57, it is caught up with huge volumes of air furnished by the blower and this air serves to atomize or to render fog-like the spray and to carry it as a mist in well defined paths over long distances and in a direction determined by the deflecting action of the vanes 19.

As these vanes move up in the manner described hereinbefore, the stream of air will cause the fine spray to be directed upwardly and the lowering of the vanes will provide any desired slant to the direction of the spray. The spray emitted from the nozzles 58, 61 is atomized or distributed by the air that passes between the lower louvres 63 (Fig. 10) and to some extent is under the control of the air discharged at the oval opening when the deflectors are pointed at a sharp angle downwardly.

The combination of the nozzles 57, 58 and 61, together with the air-directing effects provided by the vanes 19, is such that large quantities of liquid spray can be directed in a highly efficient and precisional manner against bushes, small trees, but more especially toward low-lying crops including short stems.

The lower nozzles 58, 61 are particularly beneficial in applying the liquid spray to foliage and short stems of low-lying crops which would not be reached by the directed spray propagated from the nozzles 57.

In operation, the operator of the tractor would critically examine the contour or the irregularities of the ground as his tractor is traveling and should he determine that there is any likelihood of missing a patch of low-lying plants or crops on account of being shielded by a hill or a hummock, he would immediately regulate the position of the lever 42 by the cords 44, 45 as to give the proper direction to the spray-carrying air streams as would reach over the hill or hummock and thereby treat such crops with the spray material.

The same maneuver would be used in case the sprayer machine was not momentarily traveling over level ground, in which case perhaps one wheel would be at a higher elevation than the other. This, again, could be compensated for by quickly regulating the position of the vanes 19 in the manner described hereinbefore.

It has been found that notwithstanding the extreme wear and strong vibration effects that are caused by the impingement of the large quantities of fast moving air against the vanes 19, particularly when these vanes are given an abrupt slant downward in order to reach the lower portion of crops that are positioned fairly close to the machine, the control apparatus including the reciprocating vertical bar 22 and the various levers and ratchet devices are sufficiently rugged and positive in operation to withstand these terrific strains.

In order to reduce the pull required on rope 44, I may provide a tension spring 64 attached at one end to the lever 26 and at the other end to any stationary position on the machine in order to counter-balance the weight of the lever 26, the bar 22, the vanes 19 and the individual rods 20.

*Description of a modified blower that can be used in the improved spray machine*

Referring to Figs. 6, 7, 8 and 13, there is shown a spray machine and blower which is of somewhat different construction from that illustrated and described in connection with Fig. 1. Instead of having the engine contained under the hood (Fig. 1) and bringing a long drive shaft through the insecticide tank, it may be more desirable to mount the industrial engine directly over the blower and to use an improved form of blower in which the air is taken from one end and projected from the other end.

Thus, in Figs. 6, 7, 8 and 13 the tank for the spray material is the same as in Fig. 1. There are two brackets 65 bolted or otherwise secured to the lower side of the tank. A sleeve 66 is welded to each of these brackets. A shaft 67 passes through the sleeves and is keyed, as indicated at 68, to each sleeve. The shaft is therefore held rigidly within the sleeves 66 as long as the keys are in place. Intermediate between the two sleeves 67 there is a pair of upright shafts 69 welded at the lower end to the shaft 67 so that the shafts 69 are also held in rigid vertical alignment.

The blower is shown diagrammatically in perspective section in Fig. 8 and includes a cylindrical casing 73. The inner ends of the brackets 70, i. e. remote from the bushings 71, are shaped to the contour of the casing 73 to which they are welded or otherwise secured. The blower casing terminates at one end in an outwardly flanged skirt 74 for receiving a screen cover 75 (Fig. 7) through which air in sufficient quantity can be obtained.

At the front end of the casing, as seen in Fig. 8, there is a flange 76 to which the tapered housing 4 may be bolted as indicated at 77. This housing is provided with an oval air exit opening, as has been described in connection with Fig. 1.

There is also present the vane mechanism and the vane control apparatus as was fully described in connection with Fig. 1, as well as the vertical pipe 56 to which nozzles 57 are connected. Lower nozzles 61 and 58 may also be provided.

Mounted on the blower casing and also supported by the brackets 70 there is a platform indicated at 78 which serves as a foundation for an automotive engine 79 having a pulley 80. There is an opening in the blower casing suitably positioned to permit the entrance of a driving belt 81. A pulley 82 on the blower receives this belt.

The blower is properly termed "vane-axial" in that it takes in air from one end of the pump, projects it along the surfaces of the co-axial vanes and expels the air from the other end.

In Fig. 8 there is a cylindrical member 83 concentrically mounted within the casing 73 and spaced therefrom by a number of radially directed vanes 84 which extend substantially the entire length of the casing.

Within the cylinder there is a pair of spaced bearing members 85 for receiving a shaft 86, the shaft extending beyond each bearing member, and at one end receives a large vane type of fan 87 and at the other end the shaft receives the pulley 82. Both ends of the cylinder 83 are open and the right-hand end of the cylinder stops short of the left-hand end of the pulley. There is a hemispherical member 89 positioned concentric with the fan and held in space by suitably positioned brackets 90 to receive the air that passes through the screen 75 and deliver this air to the fan.

The hemispherical member 89 is provided for the purpose of preventing any eddy-currents or turbulence in the air as it enters the fan system. The flare 74 also assists in this respect. The belt 81 is received by the pulley 82. It has been found that the parallel alignment of the co-axial vanes 84 reduces the back pressure on the fan 87 to an absolute minimum by minimizing any turbulence within the casing as the air flows in segments through the casing, separated from one another by the vanes.

In general, the operation of the machine shown in Figs. 6, 7 and 8 is similar to that described in connection with Fig. 1, except that in Figs. 6, 7 and 8 the machine can be of shorter length on account of mounting the engine on top of the blower instead of taking up space along the length of the machine. This modification also has the advantage over that shown in Fig. 1 in that it is not necessary to carry a fairly long drive shaft through the spray tank, requiring liquid type seals, from a fluid which might be of a corrosive character. In Fig. 6 the only drive connection between the automotive engine and the blower is through the belt 81.

In Fig. 12 I show how the discharge housing of the blower can be adapted for discharging a fan-like blast for spraying trees. In this view, the housing *4a* has a slit-like opening *4b* through which the air is discharged in a fan-like pattern to treat the foliage of orchard trees. A vane arrangement and control therefor would make the Fig. 12 arrangement suitable for trees of all sizes.

From the foregoing it is evident that I have shown and described a spray machine operating on the spray-laden air principle in which precisional control can be exercised over the direction in which the spray is propagated, and more particularly, to reach low-lying crops and small bushes as distinguished from tall trees for which other types of spray machines are more especially designed.

The improved machine is of a compact character. In one case the engine is located at the forward end of the spray tank and in the other case is located on the blower for a more direct drive connection.

The guide vanes are operated through a positive action control mechanism using a pawl and ratchet device to derive this positive action and thus to prevent the vanes from chattering or from moving in an uncontrollable manner from the position originally set, due, perhaps, to roughness of the ground or vibration of the machine.

Provision has also been made for applying the spray material to crops, or even to the grass which may be directly under the machine or not too far distant, but which is of an extremely low height. Thus the stems and the lower leaves of even small crops and low-lying bushes can be effectively treated by my improved machine.

It will be undestood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. In a spraying machine of the class described, an air blower having inlet and outlet openings, sprayer means having nozzles disposed in said blower outlet opening for discharging insecticide material in the form of a spray at said outlet opening, means comprising a plurality of vanes pivotally mounted in said blower outlet opening for directing the combined air and insecticide therefrom, means for moving the vanes upwardly or downwardly in unison to change the directional flow of the outgoing air and insecticide, said last-mentioned means comprising one set of actuating levers comprising a pawl and ratchet for moving the vanes downwardly and a second set of actuating levers comprising a second pawl and ratchet for moving the vanes upwardly, control lever means positioned between said sets of pawl and ratchets and coating therewith, said last-mentioned lever being operatively connected with said vanes whereby as said control lever is moved to the right or left, it will swing either one set or the other set of levers to cause movement of the vanes either upwardly or downwardly.

2. In a spraying machine of the class described, an air blower having inlet and outlet openings, sprayer means for discharging insecticide material at the outlet opening of said blower, means including a plurality of vanes pivotally mounted in said blower outlet opening, means comprising a pair of actuating levers including coacting escapement mechanism for moving the vanes downwardly and upwardly, control lever means fixedly mounted on a shaft, one of said pair of levers being common to the other set, said last-mentioned lever being connected with the vanes, the other of said pair of levers having a projection which extends inwardly and terminates in the path of said control lever, said control lever being loosely mounted on said shaft whereby as the control lever is swung about the shaft it is caused to strike said projection and the other of said pair of levers is caused to rotate said shaft to cause pivoting of said vanes to a new position, said control lever being adapted to swing to the right or left and when swung right will strike the projection of one set of levers and when swung left will strike the projection of the other set of levers to cause said shaft to rotate in opposite directions and thereby move the vanes upwardly or downwardly.

3. In a spraying machine of the class described, an air blower having inlet and outlet openings, sprayer means for discharging insecticide material at the outlet opening of said blower, means including a plurality of vanes pivotally mounted in the outlet opening, means for moving the vanes upwardly or downwardly in unison to direct the outgoing air and insecticide, said last-mentioned means comprising one set of actuating levers for moving the vanes downwardly and a second set of actuating levers for moving the vanes upwardly, a control lever positioned between said sets, each set comprising a pair of levers angularly positioned with respect to one another and fixedly mounted on a shaft, one of said pair of levers of each set being common to the other set, said last-mentioned lever being connected to the vanes and the other of said pair of levers having a projection which extends inwardly and terminates in the path of said control lever, said control lever being loosely mounted on said shaft whereby as the control lever is swung about the shaft it is caused to strike said projection, the other of said pair of levers is caused to rotate said shaft and move the lever connected with the vanes, said control lever being adapted to swing to the right or left and when swung right will strike the projection of one set of levers and when swung left will strike the projection of the other set of levers to cause said shaft to rotate in opposite directions and thereby move the vanes in opposite directions, and means comprising a pair of pawls and cooperating ratchet wheels located on opposite sides of the control lever, said pawls being rotatably mounted respectively on said levers which have the projections, and means whereby when the control lever is moved, it will temporarily press the pawl out of its ratchet teeth in the direction in which it is moving and will permit the pawl again to engage the teeth of the ratchet when the movement of the control lever stops, whereby the vanes are held rigidly in the last position to which they are actually moved.

4. In a spraying machine of the class described, an air blower having inlet and outlet openings, means for introducing atomized insecticide material at the outlet opening, means including a plurality of vanes pivotally mounted in the outlet opening, means for moving the vanes upwardly or downwardly in unison to direct the outgoing air and insecticide, said last-mentioned means comprising an actuating arm fixedly mounted at one end on a shaft and connected to the vanes at the other end, a pair of spaced levers keyed to said shaft and extending in the same direction, a control lever loosely mounted on the shaft between said pair of levers, projections on said pair of levers which extend inwardly overlapping one another and in line with the path of the control lever as the latter is swung about the shaft, said control lever being arranged to strike one or the other of said projections and cause the corresponding lever to rotate in a predetermined direction whereby said actuating arm will be correspondingly moved to reposition said vanes.

5. In a spraying machine of the class described, an air blower having inlet and outlet openings, a conically shaped air-flow compartment attached to the outlet opening, said compartment being tapered down to an oval opening with parallel sides and rounded ends, a plurality of pivotally mounted vanes extending transversely of the oval opening, a vertical pipe located midway of the edges of said oval opening and positioned directly in front of said vanes, said vertical pipe being provided with spaced spray nozzles throughout its length, and means comprising locking mechanism for changing the angular position of said vanes whereby as the blower is operated and insecticide is furnished to said vertical pipe and discharged from said spray nozzles, the direction in which the insecticide-carried air is propagated from said oval opening is predetermined by the setting of said vanes.

6. In a spraying machine of the character described, an air blower having inlet and outlet openings, a tapered outlet compartment attached to the outlet opening of the blower to provide an air-directing vane chamber, sprayer means including spray nozzles positioned directly in front of said vane chamber for introducing insecticide into the air stream as it passes through said tapered compartment, said tapered outlet compartment having a plurality of air-deflecting openings at the bottom thereof to release a limited quantity of air therethrough, and spray nozzle means for introducing a stream of insecticide at the bottom of said compartment opposite said air-deflecting openings.

7. In combination with a sprayer, a mobile frame, a tank on the frame, and a self-contained motor driven blower at the back end of said frame, vertical bars at the back of said frame, means on said blower unit engaging said bars for supporting the blower unit on the frame, said blower unit comprising an inwardly tapered venturi-shaped discharge opening, means comprising a plurality of pivoted vanes in the opening to direct the air blast from the blower, means for discharging material from said tank and into said air blast, and means for adjustably positioning and locking said vanes in different positions to change the directional flow of said air blast.

References Cited in the file of this patent

UNITED STATES PATENTS

| | | |
|---|---|---|
| 2,475,449 | Daugherty | July 5, 1949 |
| 2,587,240 | Spreng | Feb. 26, 1952 |
| 2,667,717 | Daugherty | Feb. 2, 1954 |
| 2,676,057 | Daugherty | Apr. 20, 1954 |